C. W. Burdic
Cutter Holder.

Nº 59,958. Patented Nov. 27, 1866.

Witnesses:
F. A. Jackson
J. A. Serice

Inventor:
Chas. W. Burdic
Per Munn & Co
Attorneys

United States Patent Office.

IMPROVEMENT IN TURNING AND PLANING TOOLS.

CHARLES W. BURDIC, OF NORWICH, CONNECTICUT.

Letters Patent No. 59,958, dated November 27, 1866.

SPECIFICATION.

TO ALL WHOM IT MAY CONCERN:

Be it known that I, CHARLES W. BURDIC, of Norwich, in the county of New London, and State of Connecticut, have invented a new and useful Improvement in Turning or Planing Tool; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish an improved tool for turning or planing iron or steel, the holder of which can receive and hold cutters of various shapes, and designed for various uses. And it consists in the combination of the holder, shoe, cutter, and set-screw with each other, when the said holder and shoe are constructed and arranged substantially as herein described and for the purpose set forth.

Figure 3:
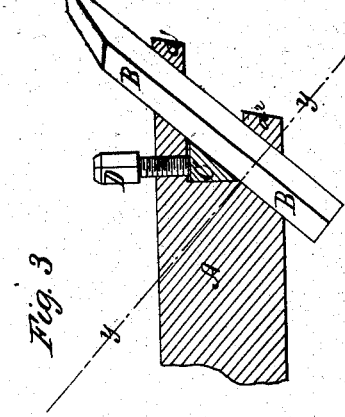
Figure 3 is a detail sectional view of the same, taken through the line $x\ x$, fig. 2, and showing the cutter in place.
Figure 4:
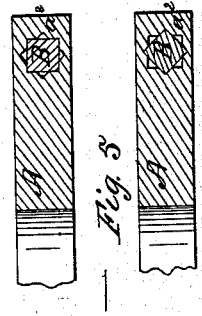
Figure 4 is a detail sectional view of the same, taken through the line $y\ y$, and showing a square cutter in place in the holder.
Figure 5:
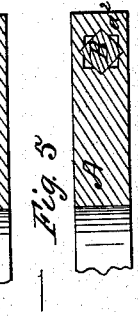
Figure 5 is the same view as fig. 4, showing a diagonal cutter in place in the holder.
Figure 1:
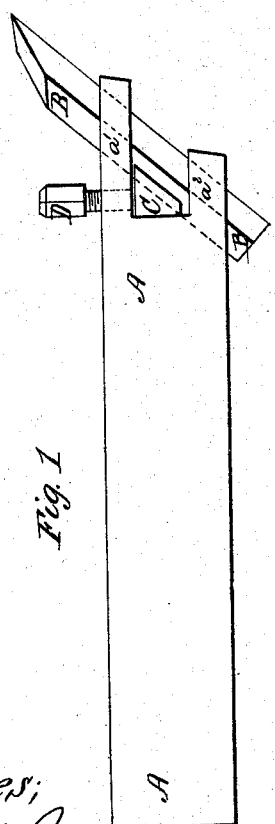
Figure 1 is a side view of my improved tool, showing the cutter in place.
Figure 2:
Figure 2 is a front view of the same, the cutter being removed.

A is the holder, upon the forward end of which are formed two arms, $a^1$ and $a^2$, by cutting a square notch into the said end, as shown in figs. 1 and 3. The arm $a^2$ is made shorter than the arm $a^1$, and they are both mortised obliquely with a star-shaped or eight-angled mortise, as shown in the drawings; that is to say, the mortise consists of two concentric square mortises, having the same dimensions and the same axis, and arranged diagonally with respect to each other, so that the mortise may receive a square tool, as shown in fig. 4, or a diagonal tool, as shown in fig. 5. B is the cutter, which, when diagonal, is placed in the mortise in the position shown in figs. 1, 3, and 5, and when square, in the position shown in fig. 4. C is the shoe, which is the triangular block fitting into the triangular space between the cutter B, the arm $a^1$, and the body of the holder A, as shown in figs. 1 and 3. The face of the shoe, C, that comes in contact with the cutter, B, is grooved with an angular groove, as shown in dotted lines in fig. 1. When a diagonal cutter is used, the corner of said cutter enters the angular groove in the face of the shoe, C, as shown in fig. 1. But when a square cutter is used, its flat side rests against the face of the said shoe on each side of the said groove. D is a set-screw passing in through a screw-hole formed through the arm, $a^1$, of the holder, A, so that its end may rest against the side of the shoe, C, forcing it forward and clamping the cutter, B, securely in whatever position it may be placed.

I claim as new, and desire to secure by Letters Patent—

The combination of the holder A, shoe C, cutter B, and set-screw D, when the said holder and shoe are constructed and arranged substantially as herein described, and for the purposes set forth.

CHARLES W. BURDIC.

Witnesses:
 CHARLES H. BROWNE,
 SOLOMON LUCAS.